United States Patent Office 3,605,279
Patented Sept. 20, 1971

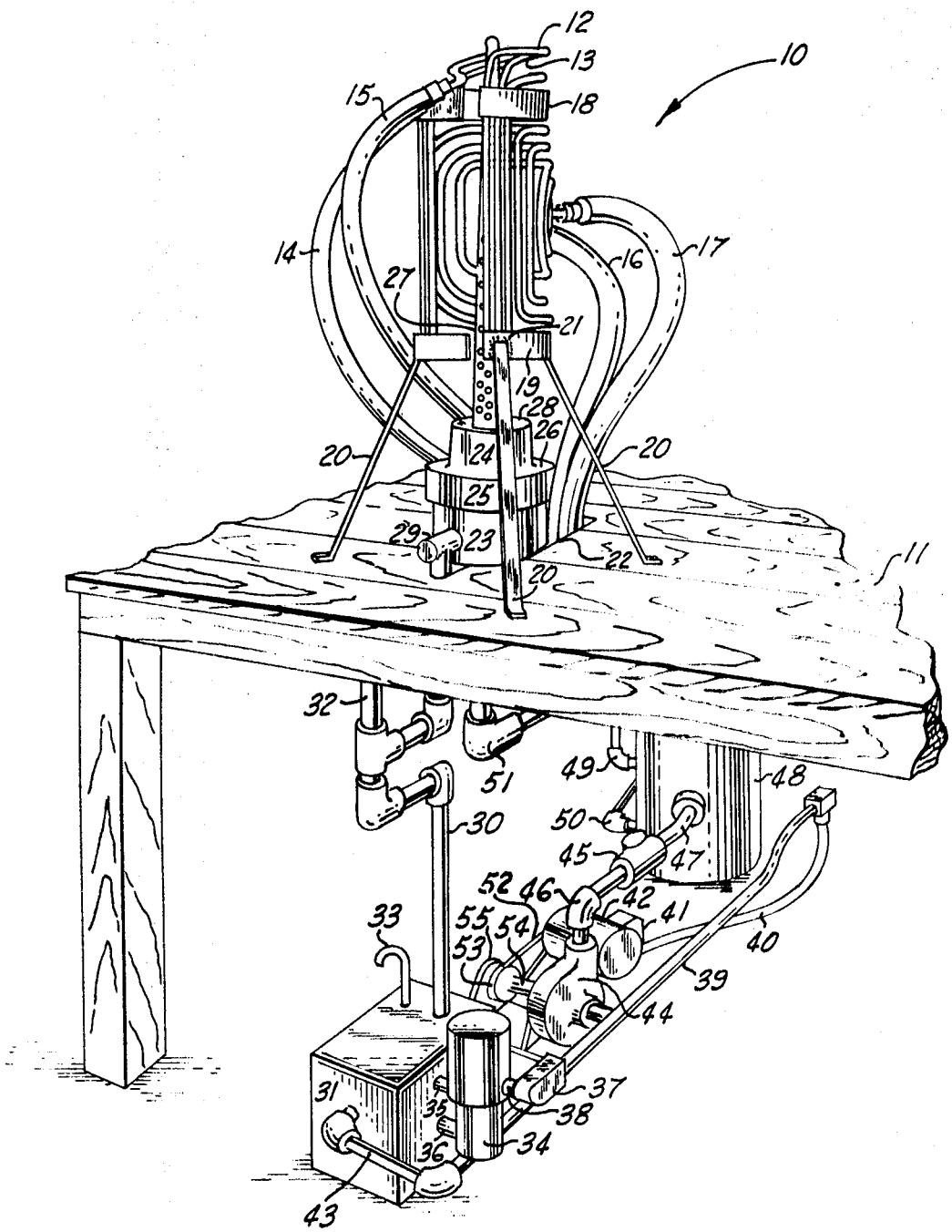

3,605,279
APPARATUS FOR DEGREASING A ROCKET MOTOR CASE
William D. Fiser, Huntsville, Ala., and Allan E. Williams, Kingsland, Ga., assignors to Thiokol Chemical Corporation, Bristol, Pa.
Filed Aug. 1, 1969, Ser. No. 846,745
Int. Cl. B08b 9/12
U.S. Cl. 34—104    9 Claims

ABSTRACT OF THE DISCLOSURE

An apparatus that utilizes a vaporized solvent for degreasing a rocket motor case and having water cooling coils incorporated therein to chill the rocket motor case and thereby condense the vapor after it enters the rocket motor case so that the condensate will contact and flow down the interior wall surface of the rocket motor case to remove any contaminants therefrom.

BACKGROUND OF THE INVENTION

(1) Field of the invention

It is an absolute necessity in the assembly of a solid propellant rocket motor to remove all contaminants from the interior wall surface of the rocket motor case for the solid propellant rocket motor. This must be achieved to provide a perfect and complete bond between the interior wall surface of the rocket motor case and an insulating liner that is to be installed in the rocket motor case.

The instant invention, therefore, contemplates an apparatus for removing such contaminants so that a perfect and complete bond between the liner and the rocket motor case will result.

(2) Description of the prior art

Degreasing of the interior wall surface of rocket motor cases, pressure vessels or similar articles is not new, but it is believed that the use of water coils to cool the rocket motor case and thereby condense the vaporized solvent, is an advance in the art that will achieve a more efficient degreasing of the rocket motor case than has resulted in the past.

SUMMARY OF THE INVENTION

This invention relates to improvement in apparatus for degreasing the rocket motor case of a solid propellant rocket motor and more specially it relates to an apparatus including water cooling coils that will condense a vaporized solvent that is sprayed into the interior of the rocket motor case by cooling the rocket motor case to cause the condensate created by such cooling to flow down the interior wall surface of the rocket motor case and thereby remove the contaminants therefrom.

In assembling a solid propellant rocket motor, it is the usual procedure to bond to the interior wall surface of a rocket motor case, a liner of insulation, such insulation to protect the rocket motor case from the intense heat created by the burning of the solid propellant grain that is cast into the rocket motor case and is bonded to the liner already installed in the rocket motor case. Should contaminants prevent a perfect bond between the liner and the interior surface of the rocket motor case, the solid propellant rocket motor will have to be rejected if the bond failure is discovered or if the bond failure is not discovered the rocket motor case will suffer damage from the burning of the solid propellant grain, thereby resulting in the solid propellant rocket motor unsuccessfully carrying out its operational requirements.

It is an object of the invention, therefore, to provide an apparatus that will efficiently remove all contaminants from the interior wall surface of a rocket motor case to prevent bond failure between a liner that is installed in the rocket motor case to be bonded to the interior wall surface of the rocket motor case.

With the above and other objects and advantages in view as might appear to one skilled in the art after reading the following description, it is to be understood that the invention consists of the specific embodiment more fully illustrated in the accompanying drawing in which:

BRIEF DESCRIPTION OF THE DRAWING

The single figure illustrating an elevational perspective view, partly broken away of a degreasing apparatus embodying the invention.

DESCRIPTION OF THE PREFERRED EMBODIMENT

Referring more in detail to the drawing wherein like parts are designated by like reference numerals, the reference numeral 10 is used to generally designate the degreasing apparatus embodying the invention and 11 the support which is associated therewith.

It is to be understood that there are many and various sizes of solid propellant rocket motors and the degreasing apparatus 10 is susceptible of being assembled to be able to degrease any size of rocket motor case that is associated with such solid propellant rocket motors.

The degreasing apparatus 10 comprises 1st and 2nd coils 12 and 13, and water, which is used as a cooling medium, is fed to coils 12 and 13 by supply lines 14, 15, 16 and 17. The flow of the water from the supply lines 14, 15, 16 and 17 is such that two of the supply lines may be used to force water into the coils 12 and 13 and two of the supply lines may be used to draw water from the coils 12 and 13. The flow of water may be reversed so that the flow of water into the coils 12 and 13 may be in the same direction or the flow of water may be in opposite directions and the supply of water, as well as the direction of flow of the water is controlled by a conventional water supply system, not shown.

Reinforcing split circular strengthening bands 18 and 19 are secured by any well-known method to the upper and lower portions of the coils 12 and 13 and brace legs 20 are secured at their upper ends to the lower band 19 by welding 21 or the like, while the lower ends of the legs 20 may be secured in any well-known manner to the support 11 so that the coils 12 and 13 are in vertical relation to the support 11 to receive therein a rocket motor case, as will be later described.

Extending upwardly through an opening 22 in the support 11 is a rocket motor case stand 23, it being noted that the supply lines 14, 15, 16 and 17 also extend through the opening 22. The stand 23 comprises a central cylindrical portion 24 that extends into the open end of the rocket motor and a circular shelf portion 24 of greater diameter on which the rim of the rocket motor case will rest. The shelf portion 25 is in circumjacent relation to the cylindrical portion 24 and is spaced therefrom by a circular gutter 26. The stand 23 has a central bore therethrough so that a tubular perforated spray nozzle 27 may extend through the bore to terminate within a short distance of the upper levels of the coils 12 and 13. There is also a circular gutter 28 within the cylindrical portion 24 that is in circumjacent relation to the nozzle 27. The gutters 26 and 28 are in communication with an outlet pipe 29 that through a drain pipe 30 that consists of a series of conduits and pipe joints is in communication with a sump chamber 31. A valve controlled vent pipe 32 is in communication with the drain pipe 30 and a vent 33 is provided for the sump 31.

An electrically operated float valve 34 is connected to and has communication with the sump 31 by connections 35 and 36 and a switch 37 is connected at 38 to the valve 34 and to an electrical conduit 39 that is connected by an electrical line 40 to a control 41 for an electric motor 42.

An outlet conduit 43 is connected to and has communication at one end with the sump 31, the opposite end being connected to a pump 44. The pump 44 is connected in turn to a check valve 45 by a conduit 46 and the check valve 45 is connected by a conduit 47 to a solvent supply tank 48.

Steam inlet and outlet pipes 49 and 50 are connected to a steam coil within the tank 48 and the tank 48 is connected by a conduit 51 to the nozzle 27. The pump 44 is operated by the electric motor 42 by means of a V-belt 52 that connects the drive shaft of the electric motor to a pulley 53 on a drive shaft 54 for the pump 44 that is journalled in a bracket 55.

In the operation of the degreasing apparatus 10, the tank 48 is checked to be sure the solvent therein is at the proper operating level. Trichlorethylene has been found to be the best solvent for removing contaminants from the rocket motor case, but methylene chloride may also be used. If the degreaser 10 has been used previously, the operation of valve 34 is checked and any sludge that is in the sump 31 is removed.

A rocket motor case, not shown, is then, by suitable lifting and handling equipment, lowered within the coils 12 and 13 until it engages and rests on the shelf 25, and is in vertical relation to the support 11. The tolerance between the coils 12 and 13, which are shaped to conform to the configuration of the rocket motor case, is such that the motor case will move freely therein without damaging the coils 12 and 13 but will not be spaced too far therefrom to not be cooled by the water circulating within the coils 12 and 13.

When the motor case is in position, steam is permitted to flow into the coil within the tank 48 to vaporize the solvent therein. The vaporized solvent is then conducted to the nozzle 27 and sprayed into the interior of the rocket motor case. When the vaporized solvent is freely flowing, the water is then fed to the coils 12 and 13 by supply lines 14, 15, 16 and 17 in either of the directions, as previously set forth.

As the water cools the rocket motor case, the vaporized solvent will be condensed so that it will flow downwardly over the interior wall surface of the rocket motor case. Such action will remove the contaminants from the interior wall surface of the rocket motor case and the dirty solvent, after it flows from the interior wall surface of the rocket motor case, will drip into the gutters 26 and 28 from where it will drain through outlet 29 and drain pipe 30 into the sump 31.

Any sludge in the solvent will settle to the bottom of the sump 31 and the valve 34 will, when the solvent reaches a predetermined level, start the electric motor 42 to start the pump 44 to pump the solvent out of the sump 31 into the tank 48. The valve 45 preventing any reversal of this flow so that the solvent will not flow out of the tank 48 back into the sump 31.

The solvent pumped out of the sump 31 will mix with the solvent in the tank 48 and the procedure previously described will continue until it has been determined that the rocket motor case has been decontaminated, at which time the steam supply is turned off and the vaporized solvent will no longer flow into the rocket motor case. The rocket motor case is then lifted slightly so that the dripping solvent can be seen. When the solvent stops dripping, the water supply to the coils 12 and 13 is cut off and the rocket motor case is ready to be removed from the degreaser 10.

There has thus been provided a degreasing apparatus for removing contaminant from the interior wall surface of a rocket motor case and it is believed that from the foregoing description the construction and the mode of operation of the degreasing apparatus will be clear to those skilled in the art and it is to be understood that variations or modifications of the apparatus may be indulged in providing they fall within the spirit of the invention.

Having thus described the invention what is claimed as new and desired to be secured by Letters Patent is:

1. A degreasing apparatus for removing contaminants from the interior wall surface of a rocket motor case comprising a stand for supporting the motor case in a vertical position, first and second coils positioned in circumjacent relation to the motor case and conforming to the configuration thereof, a spray nozzle for injecting a vaporized solvent into the rocket motor case extending upwardly to said stand and said first and second coils, means for supplying water to said first and second coils for cooling the rocket motor case to condense the solvent, means on said stand for collecting said condensed solvent, means connected to said collecting means for storing said solvent, a supply tank for containing the solvent and feeding it to said nozzle, pumping means connected to said solvent storing means for returning said solvent to said supply tank, an electric motor for operating said pumping means and means including a valve connected to said solvent storing means to start said electric motor and pump said solvent when said solvent reaches a predetermined level in said storage means.

2. A degreasing apparatus for removing contaminants from the interior wall of a rocket motor case comprising a stand for supporting the motor case in a vertical position, said stand having a circular portion to fit inside said rocket motor case and a circular shelf in circumjacent relation to said circular portion on which said rocket motor case is positioned, first and second coils positioned in circumjacent relation to the motor case and conforming to the configuration thereof, a spray nozzle for injecting a vaporized solvent into the rocket motor case extending upwardly through said stand and said first and second coils, means for supplying water to said first and second coils for cooling the rocket motor case to condense the solvent, and a supply tank for containing the solvent and feeding it to said nozzle.

3. A degreasing apparatus as in claim 2 wherein said circular portion is provided with a centrally located gutter to receive the solvent as it drips from the rocket motor case.

4. A degreasing apparatus as in claim 2 wherein a gutter is positioned between said circular portion and said shelf to receive the solvent as it drips from the motor case.

5. A degreasing apparatus for removing contaminants from the interior wall surface of a rocket motor case comprising a stand for supporting the motor case in a vertical position, first and second coils positioned in circumjacent relation to the motor case and conforming to the configuration thereof, circular split bands connected to said first and second coils for strengthening and reinforcing said bands, a spray nozzle for injecting a vaporized solvent into the rocket motor case extending upwardly through said stand and said first and second coils, means for supplying water through said first and second coils for cooling the rocket motor case to condense the solvent, and a supply tank for containing the solvent and feeding it to said nozzle.

6. A degreasing apparatus as in claim 5 wherein said stand is provided with means for collecting said solvent as it flows from the rocket motor case.

7. A degreasing apparatus as in claim 6 wherein means for storing said solvent is connected to said collecting means.

8. A degreasing apparatus as in claim 7 wherein pumping means is connected to said means for storing said solvent for returning it to said supply tank.

9. A degreasing apparatus as in claim 8 wherein an electric motor is provided for operating said pumping means and means including a valve is connected to said solvent storing means to start said motor for pumping said solvent from said storage means when said solvent reaches a predetermined level in said solvent storage means.

References Cited

UNITED STATES PATENTS

| 2,196,846 | 4/1940 | Andrus | 202—169 |
| 2,307,802 | 1/1943 | Reichel | 34—73 |
| 2,348,465 | 5/1944 | Geiringer | 34—21X |

FREDERICK L. MATTESON, Jr., Primary Examiner

H. B. RAMEY, Assistant Examiner

U.S. Cl. X.R.

134—107; 202—170